United States Patent [19] [11] 3,911,206

Nasu [45] Oct. 7, 1975

[54] IMAGE COMMUNICATION SYSTEM

[75] Inventor: Takuya Nasu, Hirakata, Japan

[73] Assignee: Matsushita Electric Industrial Co., Ltd., Osaka, Japan

[22] Filed: Aug. 31, 1973

[21] Appl. No.: 393,281

[30] Foreign Application Priority Data

| | | |
|---|---|---|
| Sept. 1, 1972 | Japan | 47-87752 |
| Sept. 1, 1972 | Japan | 47-87753 |
| Sept. 1, 1972 | Japan | 47-87754 |
| Sept. 1, 1972 | Japan | 47-87755 |
| Sept. 1, 1972 | Japan | 47-87756 |

[52] U.S. Cl. .......... 178/6; 250/199
[51] Int. Cl. .......... H04b 9/00
[58] Field of Search .......... 178/6, 7.6; 250/199

[56] References Cited

UNITED STATES PATENTS

| | | | |
|---|---|---|---|
| 1,984,673 | 12/1934 | Dumont | 178/6 |
| 2,139,869 | 12/1938 | Traub | 178/7.6 |
| 3,349,174 | 10/1967 | Warschauer | 250/199 |
| 3,600,507 | 8/1971 | Newgard | 178/6 |

*Primary Examiner*—Howard W. Britton
*Attorney, Agent, or Firm*—Burgess Ryan and Wayne

[57] ABSTRACT

An image communication system is provided having a transmitting portion and a receiving portion spaced a distance from each other and placed in opposing relation, whereby picture information is transmitted from said transmitting portion to said receiving portion by using a light beam serving as a transfer medium running from said transmitting portion to said receiving portion.

This transmitting portion is provided with a light source which is intensity-modulated by a picture signal. The light beam projected from said light source is received at the receiving portion, and is deflected in vertical and horizontal directions by means of a light beam deflecting device which is adapted to operate in synchronism with the picture signal carried by said light beam received, thereby presenting an image of a light beam scanned and developed two-dimensionally. Thus, an observer at the receiving portion may view the light image thus developed two-dimensionally through an ocular portion.

9 Claims, 6 Drawing Figures

IMAGE COMMUNICATION SYSTEM

BACKGROUND OF THE INVENTION:

This invention relates to an image communication system, and more particulary to an image communication system in which an intensity modulated light beam from a stationary light source, may be scanned and developed two-dimensionally, whereby an observer may watch said light beam through an optical system.

In a television system serving as an image communication system of the conventional type, the electron beam which has been modulated by means of the picture signal is projected onto a fluorescent screen, whereby the observer may watch the picture projected on said fluorescent screen. However, such a system suffers from shortcomings such as a transmitting and receiving devices which are large, comprise complicated constructions, manufacture, adjustment and maintainance of such devices are difficult, a picture tube of the television system is hard to handle, easy to break, and the span of service life is brief. Particularly, a color television system is comprised of a complicated construction and circuits, and is hard to handle and to adjust.

Furthermore, manufacture of a color picture tube requires a highly skilled technique. In television, involving using a radio wave as a means of communication, a picture image of the television is disturbed by an electric wave, although conventional television broadcasting equipment can transmit a picture image for a far distance.

SUMMARY OF THE INVENTION:

It is accordingly an object of the invention to provide an image communication system in which the transmitter is provided with a light source projecting an intensity-modulated light beam, and where the devices of the receiver are small in size, light in weight, easy to handle and simple to construct.

It is a further object of the invention to provide an image communication system which provides a simple and handy means for communication, being free from jamming by radio wave or any other limitations, or obstacles of this kind.

According to the present invention, the transmitting portion comprises a video frequency amplifier and a light source as an electroluminescent element. The receiving portion comprises a light beam deflecting device which is adapted to receive the modulated light beam projected from the light source of the transmitting portion for two-dimensional scanning and developing, a synchronous circuit to synchronize the light beam deflecting device, and an observing device through which an observer can directly watch the image of the light beam which has been scanned and developed two-dimensionally. Accordingly, the image communication system of the invention provides the following features and advantages.

The receiving and transmitting devices are simple in construction, compact in size, and light in weight and portable, thereby finding a wide application for domestic use as well as the application as an image communication device for use outdoors for communication between two individuals.

Since a picture tube is not used, the image communication system of the invention can be manufactured at a low cost and is easy to maintain, adjust and handle, with the accompanying advantage of a long service life.

Because of the incorporation of adapter units such as a telescope, light intensifier and light conversion devices, the image communication system of the invention permits the transmission of the image information for a fairly long distance, particularly a further long-distance communication on the sea at night.

When an observer is watching the transmitting portion through the receiving portion the observed modulated beam as well as the background image is scanned rapidly. Thus, the background scene is scanned so rapidly that it is not observed as image information, even in day time. The light-deflecting and scanning operations as described permit only visual locus given from the light source of the transmitting portion to form a significant picture, while the background image is blurred beyond recognition.

When an observer is watching the light source of the transmitting portion, the light projecting from the light source may be viewed as an intensity-modulated light beam. However, when another observer is watching the light source of the transmitting portion through the receiving portion, the light projecting from the light source may be viewed as a picture. Accordingly, a confidential image may be transmitted to a specific individual. In other words, only a person at the receiving end sees a coherent image (after appropriate scanning).

The invention may best be understood with reference to the following description taken in connection with the accompanying drawings.

Figure 1:
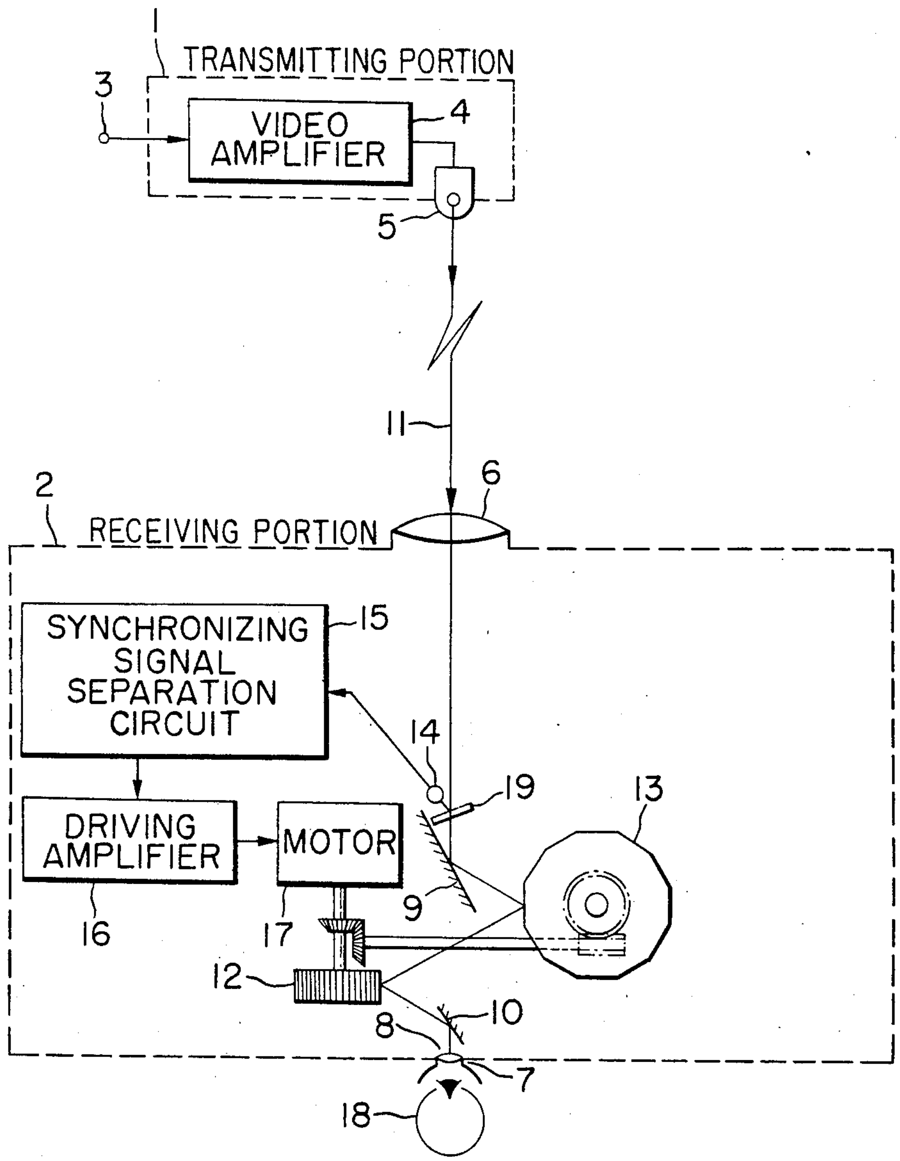
FIG. 1 shows the construction of one embodiment of an image communication system of the present invention.

DESCRIPTION OF THE PREFERRED EMBODIMENTS:

Referring to FIG. 1, the system consists of a transmitting portion 1 and a receiving portion 2.

A light source 5 is provided in the transmitting portion 1 and serves as a light beam radiating element, whose light is to be intensity-modulated. The beam from this light radiating element is intensity-modulated by a picture signal which has been selectively fed through a video amplifier 4 from a television camera, VTR or other image communication sources. The intensity-modulated light beam 11 projected from the transmitting portion 1 is received in the receiving portion 2 spaced at a distance from said transmitting portion 1. The light beam 11 thus received is transmitted through an objective lens 6 in the receiving portion 2, then through a beam splitting mirror 19 and then reflected, in turn, to a flat reflecting mirror 9, at a vertical deflecting rotary polyhedral mirror 13, at a horizontal deflecting rotary polyhedral mirror 12 and at a reflecting mirror 10, and then transmitted through an ocular portion 8 to the eyes 18 of an observer. Part of the light beam 11 passed through the objective lens 6 is reflected at the half mirror 19 and detected at a photoelectric conversion element 14. A synchronizing signal is separated from the output signal of said element 14 in a synchronizing-signal separating circuit 15, while the synchronizing signal is amplified at a driving amplifier 16, whereby the output of amplifier 16 may synchronously rotate a motor 17.

The synchronous rotation of said motor 17 will cause the horizontally deflecting rotary polyhedral mirror 12 and the vertically deflecting rotary polyhedral mirror 13 to rotate in synchronous relation with the image signal of the transmitting portion 1.

Accordingly, the light beam projected from the transmitting portion 1 will be deflected both in the horizontal and vertical directions, maintaining a given synchronous relation, and thus there will be obtained a scanning raster of said light beam source 5 on the retina of an observer 18.

Figure 2:
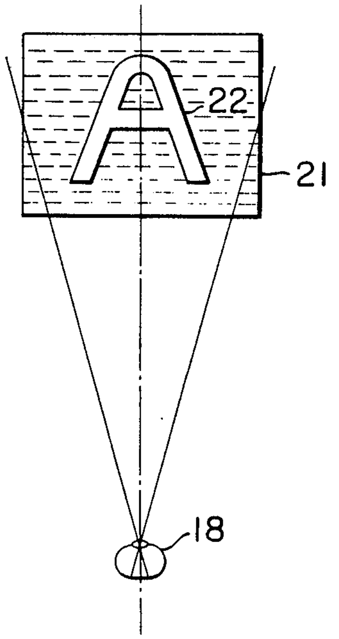
FIG. 2 is an explanatory view of an image raster as viewed through eyes of an observer in the receiving portion of an image communication system of the invention.

When an observer watches the light source 5 of the transmitting portion by looking in at an eyepiece portion 7 of the receiving portion, a raster 21 of the light source 5 may be visually recognized as a two-dimentionally developed image existing in the space by a physiological afterimage effect on the retina and memory effect of the observer, thus presenting a clear picture 22 in the space as shown in FIG. 2.

This principle can readily be understood by referring to a case, as, for example, when a spot light such as a flashlight is swung in the dark in vertical and horizontal directions, there appears a two-dimensional image in space.

On the other hand, viewing the transmitting portion through the receiving portion, the environmental scene will be completely blurred due to the aforesaid deflecting scanning, so that the visual locus formed by the light source 5 of the transmitting portion forms a significant image, with no observable background scene. This would be similar to observing a stationary flashlight in the above example through a rapidly oscillating mirror. The light would appear as a line, while the background would be blurred beyond recognition.

In FIG. 1, the image communication system enables the transmitting of an image information over a fairly long distance by the incorporation of a telescope instead of the objective lens 6 in the receiving portion, and may be communicated for a further long distance on the sea or at night.

Figure 3:
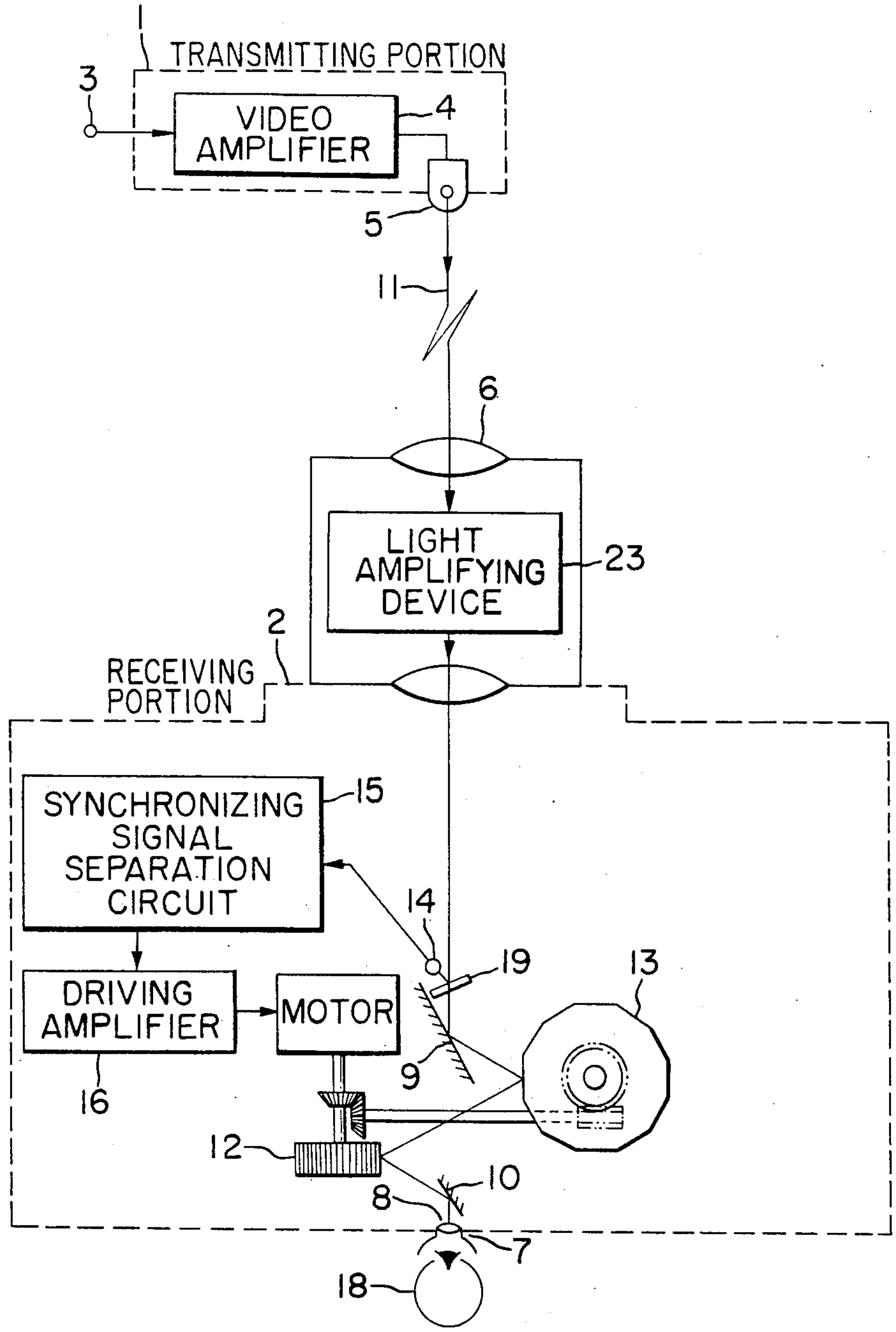
FIG. 3 is an explanatory view showing an adapter unit provided in the receiving portion of another embodiment of an image communication system of the present invention.

When the light beam projecting from the transmitting portion and receiving the receiving portion is relatively feeble, as shown in FIG. 3, the receiving portion is provided with a light amplifying device 23 such as an image-intensifier tube at the rear of the objective lens 6.

Furthermore, an infrared light source may be used as a light source 5 in the transmitting portion, while there may be used as an adapter unit in the receiving portion a light converter device for use in converting from non-visible light to visible light, such as an image converter tube.

Still furthermore, a laser oscillator may be used as the light source 5 in the transmitting portion, while a light converter device for use in converting from non-visible light to a visible light, such as an image converter tube, may be used as an adapter unit in the receiving portion for the safety of the eyes. In this case, a light-intensifier device such as an image intensifier may be used in combination with a light amplifier, as required.

Figure 4:
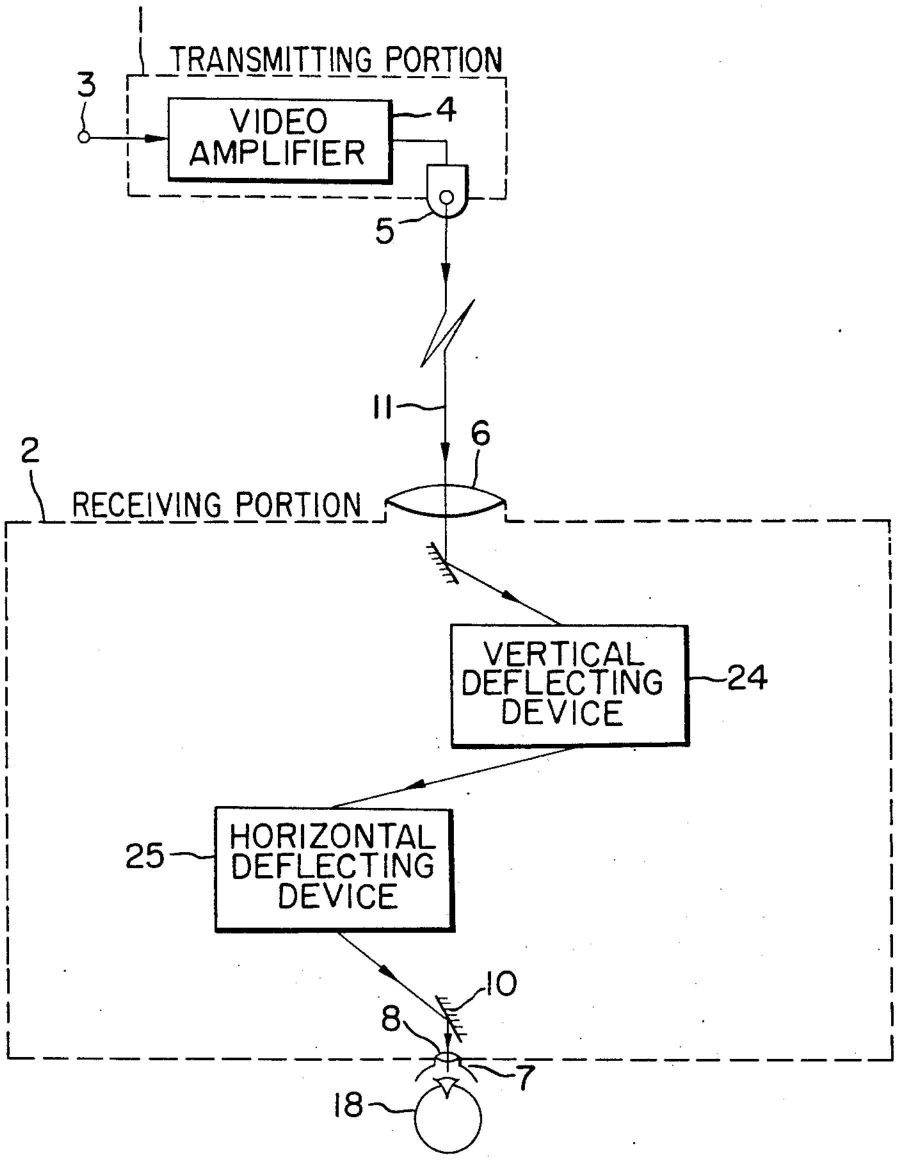
FIG. 4 is an explanatory view showing the construction of a light deflecting device provided in the receiving portion of a still further embodiment of the invention.

FIG. 4 shows another embodiment of the invention, wherein a piezoelectric element is used as a light beam deflecting means in place of the rotary polyhedral mirror as described earlier.

The light beam 11 from the light source 5 is transmitted through the objective lens 6 and reflected at the flat reflecting mirror 9, then developed two-dimensionally at the vertical deflecting device 24 and a horizontal deflecting device 25 using an electric strain element such as piezoelectric element, after which the light thus developed is reflected at the reflecting mirror 10 and then into the eyes 18 of an observer, in a manner as described in the previous embodiment.

Figure 5:
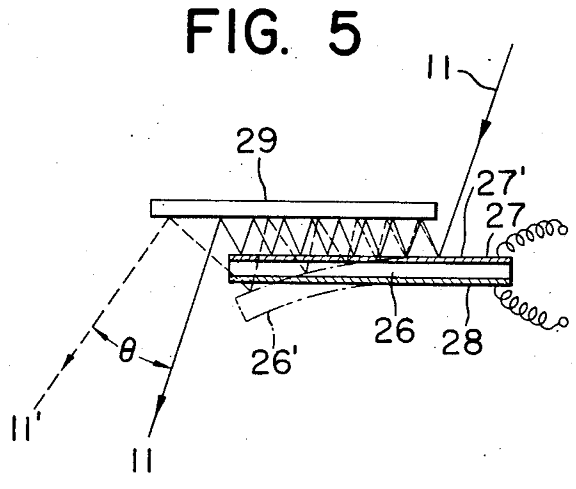
FIG. 5 is an explanatory view illustrating the operational principle of a light deflecting device of the embodiment shown in FIG. 4.

The vertical deflecting device 24 and horizontal deflecting device 25 using a piezo-electric element are of the construction shown in FIG. 5. In other words, FIG. 5 shows the vertical deflecting device 24 of FIG. 4; however, the horizontal deflecting device 25 is of the same construction as that shown in FIG. 5. With the construction as shown in FIG. 5, the light beam 11 passed through the objective lens 6 is reflected at a reflecting mirror 27′ which is provided on the surface of one side of electrode plate 27, of the piezo electric element 26. The light thus reflected is then reflected at the reflecting mirror 29 facing said mirror 27′, and then goes out toward the horizontal deflecting device 25 as shown by an arrow, after being reflected several times between the reflecting mirror 27′ and the reflecting mirror 29. At this time, when there is impressed to the electrode plates 27 and 28 of the piezoelectric element 26 a deflecting voltage, i.e., the deflecting voltage which has been synchonized with the intensity-modulating signal from the light source of the transmitting portion 1, then the piezoelectric element 26 will produce a deformation as shown by the dotted line 26′, so that the light 11 is deflected in a manner as shown by the dotted line 11′, thereby scanning the light 11 in a vertical direction. The light thus scanned will be scanned two-dimensionally at the horizontal deflecting device 25 of FIG. 4 which is similar to that shown in FIG. 5, while the light reflected at the reflecting mirror 10 is then transmitted through the ocular lens 8 in the eyepiece portion 7 and then scanned on the retina of the observer 18 two-dimensionally, as has been described earlier with reference to FIG. 2.

Figure 6:
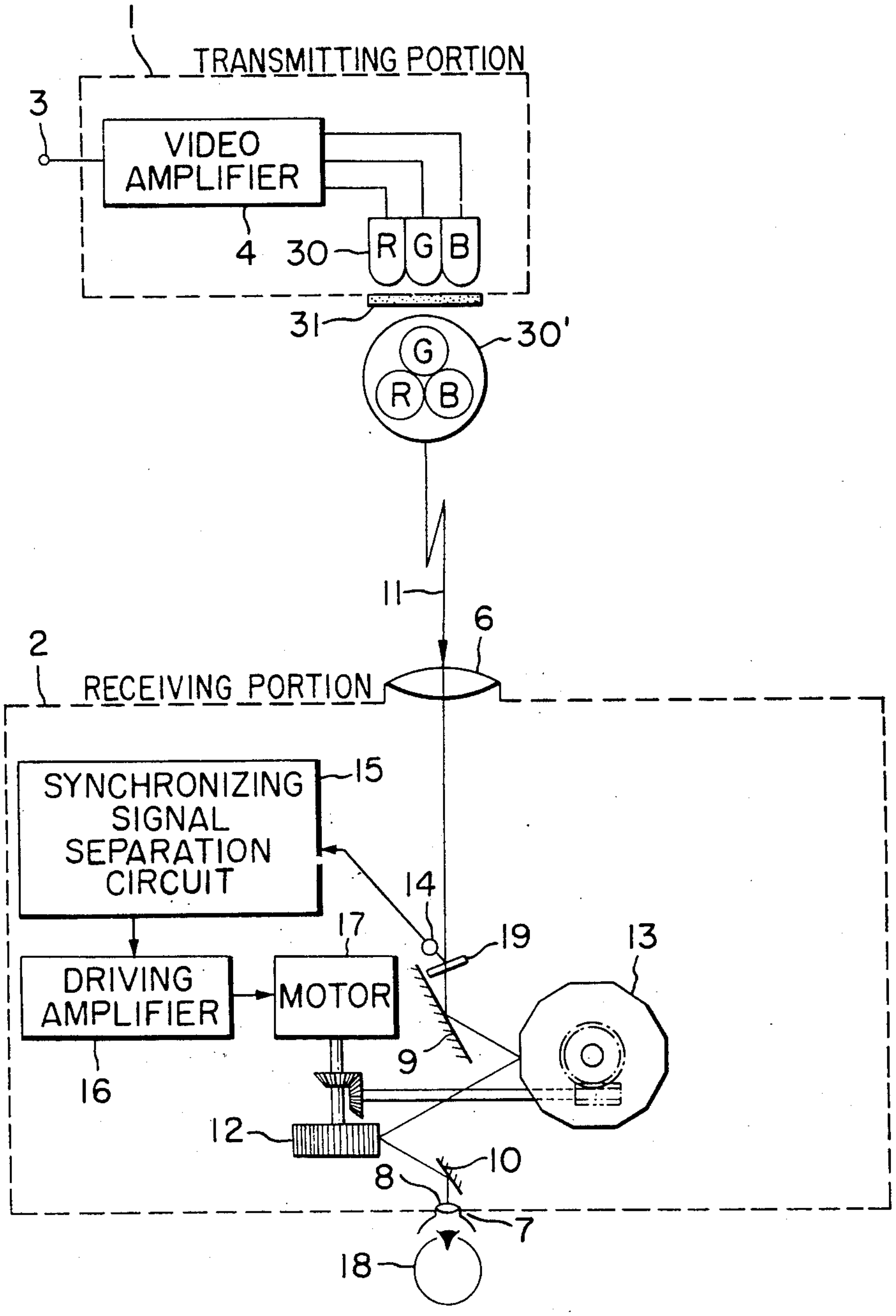
FIG. 6 shows the construction of a colour-image communication system for use in a yet further embodiment of the invention.

Referring to FIG. 6 which shows an embodiment of the image communication system of the invention adapted to transmit a color picture, a light source 30 incorporating light radiating elements R, G and B which radiate three primary colors is provided in the transmitting portion 1, in place of a light source 5 in the transmitting portion 1 of FIG. 1. The light source 30 has three light radiating elements placed in side-by-side relation as viewed from the front thereof, and is intensity-modulated by three primary color signals fed from TV camera, VTR or other picture signal source via an input terminal 3 and an amplifier 4. The light 11 of three primary colours from the light source 30, whose light is to be intensity-modulated by the three primary color signals, is developed two-dimensionally as a clear color image on the retina of the eyes 18 of an observer, as though it were in a space in a direction of the transmitting portion 1.

Meanwhile, if a diffusion plate 31 is provided in the front of the light source 30 of a three color radiating element provided in the transmitting portion 1, there will be obtained a better color mixing effect, i.e., the effect that the color image obtained is close to the natural colour as sensed by the eyes of an observer.

What is claimed is:

1. An image communication system comprising a transmitting portion having a light emitting means for intensity modulating a beam of light with a video signal; and a receiving portion having an eyepiece adapted for directly viewing said transmitting portion comprising means for deflecting in horizontal and vertical directions said light beam from said transmitting portion.

2. An image communication system as defined in claim 1 wherein said means for deflecting in horizontal and vertical directions comprising a vertical deflection rotary polyhedral mirror and a horizontal deflecting rotary polyhedral mirror which are adapted to rotate in synchronism with said picture signal.

3. An image communication system as defined in claim 1 wherein said means for deflecting in horizontal and vertical directions, comprises an electric strain element adapted to deflect the beam by means of a voltage synchronized with said picture signal.

4. An image communication system as defined in claim 1 further comprising means applying a synchronizing signal to said transmitted beam, said means for deflecting in horizontal and vertical directions comprising photoelectric detection means for detecting said transmitted beam, synchronization separating means for extracting the synchronization signals from said detected beam, and means for synchronously driving said received beam in horizontal and vertical directions with said synchronizing signal which has been detected and extraced by said synchronism-separating circuit and said photoelectric conversion element from said intensity-modulated light of said transmitting portion.

5. An image communication system as defined in claim 1 wherein said receiving portion is provided with a telescopic lens system adapted to detect the light from said transmitting portion.

6. An image communication system as defined in claim 1 wherein said light source means comprises a three-primary-color radiation element adapted to be intensity-modulated by a three primary color signal as a color picture signal.

7. The image communication system of claim 6 further comprising light diffusing means positioned in the path of said light beam before it reaches said receiving portion.

8. An image communication system comprising: means for generating and transmitting a beam of light that is intensity-modulated with image representative information; and a receiver including vertical and horizontal deflection means and an eye-piece, said vertical and horizontal deflection means being disposed in the path of said beam and operative to deflect said beam in a scanned pattern over said eye-piece, whereby a viewer can directly perceive transmitted images through said eye-piece.

9. An optical image communication system comprising a transmitting portion and a receiving portion; said transmitting portion comprising means for producing a light beam intensity modulated as a function of a video signal including scanning synchronization signals; said receiving portion comprising an objective lens and an eye piece positioned to receive light in that order from said beam, and further comprising deflecting means in the path of said light beam between said objective lens and said eye piece for deflecting said light beam in horizontal and vertical directions at said eye piece, photoelectric means, means in the path of said beam between said objective lens and eye piece for directing a portion of said beam to said photoelectric means, synchronizing signals separating circuit means connected to said photoelectric means, and means for controlling said deflecting means in response to the output of said synchronizing signal separation circuit for synchronizing the vertical and horizontal deflection of said light beam at said eye piece with said synchronization signals, whereby a two dimensional picture is directly viewable at said eye piece.

* * * * *